(12) United States Patent
McConville

(10) Patent No.: US 6,300,439 B1
(45) Date of Patent: *Oct. 9, 2001

(54) GROUP 15 CONTAINING TRANSITION METAL CATALYST COMPOUNDS, CATALYST SYSTEMS AND THEIR USE IN A POLYMERIZATION PROCESS

(75) Inventor: David H. McConville, Houston, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/435,409

(22) Filed: Nov. 8, 1999

(51) Int. Cl.$^7$ ........................................ C08F 4/44
(52) U.S. Cl. ................ 526/161; 526/127; 526/159; 526/129; 526/941; 526/943; 526/901; 526/351; 526/352; 526/172
(58) Field of Search .................. 526/127, 159, 526/129, 161, 941, 943, 901, 351, 352, 172

(56) References Cited

U.S. PATENT DOCUMENTS

| | | | |
|---|---|---|---|
| 4,057,565 | 11/1977 | Manzer | 260/429 |
| 5,426,243 | 6/1995 | Lecouve | 568/737 |
| 5,637,660 | 6/1997 | Nagy et al. | 526/160 |
| 5,707,913 | 1/1998 | Schlund et al. | 502/102 |
| 5,726,115 | 3/1998 | Horton et al. | 502/152 |
| 5,798,427 | 8/1998 | Foster et al. | 526/352 |
| 5,889,128 * | 3/1999 | Schrock et al. | 526/107 |

FOREIGN PATENT DOCUMENTS

| | | |
|---|---|---|
| 0197310 A2 | 10/1986 | (EP) . |
| 0197310 A3 | 10/1986 | (EP) . |
| 0241560 A1 | 10/1987 | (EP) . |
| 0751142 A2 | 1/1997 | (EP) . |
| 0816372 A1 | 1/1998 | (EP) . |
| 0816384 A2 | 1/1998 | (EP) . |
| 0816384 A3 | 1/1998 | (EP) . |
| 0803520 B1 | 12/1998 | (EP) . |
| 0890575 A1 | 1/1999 | (EP) . |
| 0893454 A1 | 1/1999 | (EP) . |
| 02-78663 | 3/1990 | (JP) . |
| 08-081415 | 7/1996 | (JP) . |
| 08-277307 | 10/1996 | (JP) . |
| 10-7712 | 1/1998 | (JP) . |
| 10-45904 | 2/1998 | (JP) . |
| WO 91/12285 | 8/1991 | (WO) . |
| WO 92/12162 | 7/1992 | (WO) . |
| WO 94 21700 | 9/1994 | (WO) . |
| WO 96/08498 | 3/1996 | (WO) . |
| WO 97/42197 | 11/1997 | (WO) . |
| WO 97/45434 | 12/1997 | (WO) . |
| WO 97/48735 | 12/1997 | (WO) . |
| WO 97/48736 | 12/1997 | (WO) . |
| WO 98/27124 | 6/1998 | (WO) . |
| WO 98/30569 | 7/1998 | (WO) . |
| WO 98/30612 | 7/1998 | (WO) . |
| WO 98/34964 | 8/1998 | (WO) . |
| WO 98/37109 | 8/1998 | (WO) . |
| WO 98/46651 | 10/1998 | (WO) . |
| WO 98/55467 | 12/1998 | (WO) . |
| WO 99/02472 | 1/1999 | (WO) . |
| WO 99/02536 | 1/1999 | (WO) . |
| WO 99/12981 * | 3/1999 | (WO) . |

OTHER PUBLICATIONS

*Organometallics*, Bei et al., vol. 16, pp. 3282–3302 (1997).
*Organometallics*, Grubbs, vol. 17, pp. 3149–3151 (1998).
*Macromolecules*, Repo, vol. 30, pp. 171–175 (1997).
*Polyhedron*, Guerin et al., vol. 17 (5–6), pp. 917–923 (1998).
*Inorganic Chemistry*, Furhman/Kempe et al., vol. 35, pp. 6742–6745 (1996).
*Organometallics*, Guerin et al., vol. 15 (26), pp. 5586–5590 (1996).
*Organometallics*, Guerin et al., vol. 17 (23), pp. 5172–5177 (1998).
*Macromolecular Chemistry and Physics*, Silvestro et al., vol. 197, No. 10, pp. 3209–3228 (1996).
*Journal of Organometallic Chemistry*, Harkonen et al., vol. 519, No. 1, pp. 205–208 (1996).
*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Horton et al., vol. 15, pp. 2672–2674 (1996).
*Organometallics*, Guerin et al., vol. 15, pp. 5085–5089 (1996).

* cited by examiner

Primary Examiner—David W. Wu
Assistant Examiner—William Cheung
(74) Attorney, Agent, or Firm—Jaimes Sher; Lisa Kimes Jones

(57) ABSTRACT

The present invention relates to a Group 15 containing metal catalyst compound having a substituted hydrocarbon leaving group, a catalyst system and a supported catalyst system thereof and to a process for polymerizing olefin(s) utilizing them.

14 Claims, No Drawings

GROUP 15 CONTAINING TRANSITION METAL CATALYST COMPOUNDS, CATALYST SYSTEMS AND THEIR USE IN A POLYMERIZATION PROCESS

FIELD OF THE INVENTION

The present invention relates to a Group 15 containing transition metal catalyst compounds, a catalysts system thereof and its use in the polymerization of olefin(s).

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene-type catalyst systems.

More recently, developments have lead to the discovery of anionic, multidentate heteroatom ligands as discussed by the following articles: (1) Kempe et al., "Aminopyridinato Ligands—New Directions and Limitations", $80^{th}$ Canadian Society for Chemistry Meeting, Windsor, Ontario, Canada, June 1–4, 1997; (2) Kempe et al., *Inorg. Chem.* 1996 vol 35 6742; (3) Jordan et al. of polyolefin catalysts based on hydroxyquinolines (Bei, X.; Swenson, D. C.; Jordan, R. F., *Organometallics* 1997, 16, 3282); (4) Horton, et.al., "Cationic Alkylzirconium Complexes Based on a Tridentate Diamide Ligand: New Alkene Polymerization Catalysts", Organometallics, 1996, 15, 2672–2674 relates to tridentate zirconium complexes; (5) Baumann, et al., "Synthesis of Titanium and Zirconium Complexes that Contain the Tridentate Diamido Ligand $[((t-Bu-d_6)N-O-C_6H_4)_2O]^{2-}\{[NON\}^{2-})$ and the Living Polymerization of 1-Hexene by Activated [NON]ZrMe2", Journal of the American Chemical Society, Vol. 119, pp. 3830–3831; (6) Cloke et al., "Zirconium Complexes incorporating the New Tridentate Diamide Ligand $[(Me_3Si)N\{CH_2CH_2N(SiMe_3)\}_2]^{2-}$(L); the Crystal Structure of $[Zr(BH_4)_2L]$ and $[ZrCl\{CH(SiMe_3)_2\}L]$", J. Chem. Soc. Dalton Trans, pp. 25–30, 1995; (7) Clark et al., "Titanium (IV) complexes incorporating the aminodiamide ligand $[(SiMe_3)N\{CH_2CH_2N\ (SiMe_3)\}_2]^{2-}$(L); the X-ray crystal structure of $[TiMe_2(L)]$ and $[TiCl\{CH(SiMe_3)_2\}(L)]$", Journal of Organometallic Chemistry, Vol 50, pp. 333–340, 1995; (8) Scollard et al., "Living Polymerization of alpha-olefins by Chelating Diamide Complexes of Titanium", J. Am. Chem. Soc., Vol 118, No. 41, pp. 10008–10009, 1996; and (9) Guerin et al., "Conformationally Rigid Diamide Complexes: Synthesis and Structure of Titanium (IV) Alkyl Derivatives", Organometallics, Vol 15, No. 24, pp. 5085–5089, 1996.

Furthermore, U.S. Pat. No. 5,576,460 describes a preparation of arylamine ligands and U.S. Pat. No. 5,889,128 discloses a process for the living polymerization of olefins using initiators having a metal atom and a ligand having two group 15 atoms and a group 16 atom or three group 15 atoms. EP 893 454 A1 also describes preferably titanium transition metal amide compounds. In addition, U.S. Pat. No. 5,318,935 discusses amido transition metal compounds and catalyst systems especially for the producing isotactic polypropylene. Polymerization catalysts containing bidentate and tridentate ligands are further discussed in U.S. Pat. No. 5,506,184.

While all these compounds have been described in the art, there is still a need for an improved catalyst compound.

SUMMARY OF THE INVENTION

This invention provides for an improved catalyst compound, a catalyst system and for its use in a polymerizing process.

In one embodiment, the invention is directed to a Group 15 containing transition metal catalyst compound having a substituted hydrocarbon leaving group, a catalyst system including the Group 15 containing catalyst compound and to their use in the polymerization of olefin(s).

In another embodiment, the invention is directed to a Group 15 containing bidentate or tridentate ligated transition metal catalyst compound, a catalyst system including the bidentate or tridentate ligated metal catalyst compound and to their use in the polymerization of olefin(s).

In another embodiment, the invention is directed to a catalyst compound having a metal transition metal bound to at least one leaving group and also bound to at least two Group 15 atoms, at least one of which is also bound to a Group 15 or 16 atom through another group, a catalyst system of this transition metal compound and to their use in the polymerization of olefin(s).

In still another embodiment, the invention is directed to a method for supporting the multidentate metal based catalysts system, and to the supported catalyst system itself.

In another embodiment, the invention is directed to a process for polymerizing olefin(s), particularly in a gas phase or slurry phase process, utilizing any one of the catalyst systems or supports catalyst systems discussed above.

DETAILED DESCRIPTION OF THE INVENTION

Introduction

It has unexpectedly been found that the metal based Group 15 containing catalyst compound having a substituted hydrocarbon leaving group exhibit much higher catalyst productivity as compared to the same compounds having halogen or simple alkyl leaving groups. As a result of this discovery it is now possible to provide a highly active polymerization with commercially acceptable level of productivity. Furthermore, it has also been discovered that these Group 15 containing metal catalyst compounds of the invention provide for an improved supported catalysts system, particularly for use in slurry phase or gas phase polymerizations.

Group 15 Containing Metal Catalyst Compound and Catalyst Systems

In one embodiment, the metal based catalyst compounds of the invention are Group 15 bidentate or tridentate ligated transition metal compound having at least one substituted hydrocarbon group, the preferred Group 15 elements are nitrogen and/or phosphorus, most preferably nitrogen, and the preferred leaving group is a substituted alkyl group having greater than 6 carbon atoms, preferably the alkyl substituted with an aryl group.

The Group 15 containing metal catalyst compounds of the invention generally include a transition metal atom bound to at least one substituted hydrocarbon leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group, which may be a hydrocarbon group, preferably a hydrocarbon group having 1 to 20 carbon atoms, a heteroatom containing group, preferably silicon, germanium, tin, lead, or phosphorus. In this embodiment, it is further preferred that the Group 15 or 16 atom be bound to nothing or a hydrogen, a Group 14 atom containing group, a halogen, or a heteroatom containing group. Additionally in these embodiment, it is preferred that each of the two Group 15 atoms are also bound to a cyclic group that may optionally be bound to hydrogen, a halogen, a heteroatom or a hydrocarbyl group, or a heteroatom containing group.

In an embodiment of the invention, the Group 15 containing metal compound of the invention is represented by the formulae:

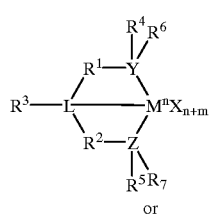

Formula (I)

or

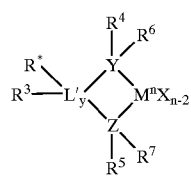

Formula (II)

wherein M is a metal, preferably a transition metal, more preferably a Group 4,5 or 6 metal, even more preferably a Group 4 metal, and most preferably hafnium or zirconium; each X is independently a leaving group, preferably, an anionic leaving group, and more preferably hydrogen, a hydrocarbyl group, a heteroatom or a halogen, and most preferably an alkyl; and at least one X is a substituted hydrocarbon group, preferably a substituted alkyl group having more than 6 carbon atoms, most preferably an aryl substituted alkyl group. The most preferred aryl substituted alkyl group is benzyl.

y is 0 or 1 (when y is 0 group L' is absent);

n is the oxidation state of M, preferably +2, +3, +4 or +5 and more preferably +4;

m is the formal charge of the YZL or the YZL' ligand, preferably 0, −1, −2 or −3, and more preferably −2;

L is a Group 15 or 16 element, preferably nitrogen;

L' is a Group 15 or 16 element or Group 14 containing group, preferably carbon, silicon or germanium;

Y is a Group 15 element, preferably nitrogen or phosphorus, and more preferably nitrogen;

Z is a Group 15 element, preferably nitrogen or phosphorus, and more preferably nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or arylalkyl group, more preferably a linear, branched or cyclic $C_2$ to $C_{20}$ alkyl group, most preferably a $C_2$ to $C_6$ hydrocarbon group;

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ arylalkyl group, or a heteroatom containing group, for example $PR_3$, where R is an alkyl group;

$R^1$ and $R^2$ may be interconnected to each other, and/or $R^4$ and $R^5$ may be interconnected to each other;

$R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent; and R* is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and RS may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. An arylalkyl group is defined to be a substituted aryl group.

In a preferred embodiment $R^4$ and $R^5$ are independently a group represented by the following formula:

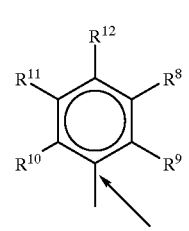

Formula (III)

Bond to Z or Y wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

Formula (IV)

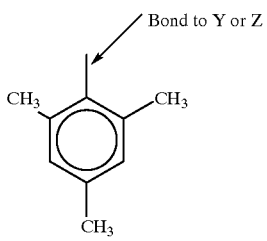

In this embodiment, M is hafnium or zirconium; each of L, Y, and Z is nitrogen; each of $R^1$ and $R^2$ is a hydrocarbyl group, preferably —$CH_2$—$CH_2$—; $R^3$ is hydrogen; and $R^6$ and $R^7$ are absent.

In a particularly preferred embodiment the Group 15 containing metal compound is represented by the formula:

Compound (1)

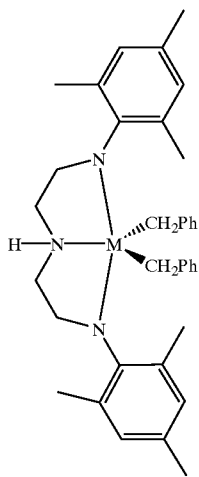

Ph equals phenyl and M is a transition metal, preferably hafnium or zirconium)

The Group 15 containing metal catalyst compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, pending discloses a gas or slurry phase polymerization process using a supported bisamide catalyst, which is also incorporated herein by reference. A preferred direct synthesis of these compounds comprises reacting the neutral ligand, (see for example YZL or YZL' of Formula I or II) with $MX_n$, is the oxidation state of the metal, each X is an anionic group, such as halide, in a non-coordinating or weakly coordinating solvent, such as ether, toluene, xylene, benzene, methylene chloride, and/or hexane or other solvent having a boiling point above 60° C., at about 20° C. to about 150° C. (preferably 20° C. to 100° C. preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal catalyst compound is prepared by a method comprising reacting a neutral ligand, (see for example YZL or YZL' of formula 1 or 2) with a compound represented by the formula $MX_n$, (where n is the oxidation state of M, M is a transition metal, and each X is an anionic substituted hydrocarbon leaving group) in a non-coordinating or weakly coordinating solvent, at about 20° C. or above, preferably at about 20° C. to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Activator and Activation Methods

The above described Group 15 containing metal catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the Group 15 containing bidentate or tridentate ligated metal catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral Group 15 containing metal catalyst compound to a catalytically active Group 15 containing metal cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral catalyst compound. While most of the publications discussed herein refer to a bulky ligand metallocene-type catalyst, it contemplated that the activators and activation methods utilized for these bully-ligand metallocene-type catalyst compounds are applicable to the Group 15 containing metal catalyst compounds of this invention.

In one embodiment, an activation method using ionizing ionic compounds not containing an active proton but capable of producing both a catalyst cation and a non-coordinating anion are also contemplated, and are described in EP-A- 0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-1-0 279 586, EP-A-0 594–218 and EP-B1-0 586 665, and PCT publication WO 94/10180, all of which are herein fully incorporated by reference.

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2, 2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating catalyst compounds with perchlorates, periodates and iodates including their hydrates. WO 98/30602 and WO 98/30603 incorporated by reference describe the use of lithium (2,2'-bisphenyl-ditrimethylsilicate). 4THF as an activator for a catalyst compound. WO 99/18135 incorporated herein by reference describes the use of organo-boron-aluminum activators. EP-B 1-0 781 299 describes using a silylium salt in combination with a non-coordinating compatible anion. Also, methods of activation such as using radiation (see EP-B 1- 0 615 981 herein incorporated by reference), electrochemical oxidation, and the like are also contemplated as activating methods for the purposes of rendering the neutral catalyst compound or precursor to a catalyst cation capable of polymerizing olefins. Other activators or methods for activating a catalyst compound are described in for example, U.S. Pat. Nos. 5,849,852, 5,859, 653 and 5,869,723 and WO 98/32775, WO 99/42467 (dioctadecylmethylammonium-bis(tris(pentafluorophenyl) borane)benzimidazolide), which are herein incorporated by reference.

In another embodiment, the invention provides for one or more Group 15 containing metal catalyst compounds used in combination with one or more activators discussed above.

It is further contemplated by the invention that other catalysts including bulky ligand metallocene-type catalyst compounds and/or conventional-type catalyst compounds can be combined with the Group 15 containing metal catalyst compounds of this invention.

Supports, Carriers and GeneralSupporting Techniques

The above described Group 15 containing metal catalyst compounds and catalyst systems may be combined with one or more support materials or carriers using one of the support methods well known in the art or as described below. For example, in a most preferred embodiment, a Group 15 containing metal catalyst compound or catalyst system is in a supported form, for example deposited on, contacted with, vaporized with, bonded to, or incorporated within, adsorbed or absorbed in, or on, a support or carrier.

The terms "support" or "carrier" are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, and mixtures thereof. Other useful supports include magnesia, titania, zirconia, magnesium chloride, montmorillonite (EP-B1 0 511 665), phyllosilicate, zeolites, talc, clays and the like. Also, combinations of these support materials may be used, for example, silica-chromium, silica-alumina, silica-titania and the like. Additional support materials may include those porous acrylic polymers described in EP 0 767 184 B 1, which is incorporated herein by reference.

It is preferred that the carrier, most preferably an inorganic oxide, has a surface area in the range of from about 10 to about 100 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 400 $m^2/g$, pore volume from about 0.8 to about 5.0 cc/g and average particle size is from about 5 to about 100 $\mu$m. The average pore size of the carrier of the invention typically has pore size in the range of from 10 to 1000Å, preferably 50 to about 500Å, and most preferably 75 to about 450Å.

Examples of supporting catalyst systems again replacing the bulky ligand metallocene-type catalyst compound with the Group 15 containing metal catalyst compounds of the invention are described in U.S. Pat. Nos. 4,701,432, 4,808, 561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed July 7, 1994 and 788,736 filed Jan. 23, 1997 and PCT publications WO 95/32995, WO 95/14044, WO 96/06187 and WO 97/02297, and EP-B1-0 685 494 all of which are herein fully incorporated by reference.

There are various other methods in the art for supporting a polymerization catalyst compound or catalyst system of the invention. For example, the Group 15 containing metal catalyst compounds of the invention may contain a polymer bound ligand as described in U.S. Patent Nos. 5,473,202 and 5,770,755, which is herein fully incorporated by reference; the Group 15 containing metal catalyst compounds of the invention may be spray dried as described in U.S. Pat. No. 5,648,310, which is herein fully incorporated by reference; the support used with the Group 15 containing metal catalyst compounds of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a Group 15 containing metal catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene- 1.

In a preferred embodiment, the Group 15 containing metal catalyst system can be combined with a carboxylic acid salt of a metal ester, for example aluminum carboxylates such as aluminum mono, di- and tri- stearates, aluminum octoates, oleates and cyclohexylbutyrates, as described in U.S. Application Ser. No. 09/113,216, filed July 10, 1998 pending.

A preferred method for producing a supported Group 15 containing metal catalyst system is described below and is described in U.S. application Ser. Nos. 265,533, filed Jun. 24, 1994 and 265,532, filed Jun. 24, 1994 and PCT publications WO 96/00245 and WO 96/00243 both published January 4, 1996, all of which are herein filly incorporated by reference. In this preferred method, the Group 15 containing metal catalyst compound is slurried in a liquid to form a solution and a separate solution is formed containing an activator and a liquid. The liquid may be any compatible solvent or other liquid capable of forming a solution or the like with the Group 15 containing metal catalyst compounds and/or activator of the invention. In the most preferred embodiment the liquid is a cyclic aliphatic or aromatic hydrocarbon, most preferably toluene. The Group 15 containing metal catalyst compounds and activator solutions are mixed together and added to a porous support such that the total volume of Group 15 containing metal catalyst compound solution and the activator solution or the Group 15 containing metal catalyst compound solution and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The most preferred methods for supporting the Group 15 metal compounds of the invention are described in U.S. Application Ser. No. 09/312,878, filed May 17, 1999 pending, which is fully incorporated herein by reference.

The mole ratio of the metal of the activator component to the metal of the supported Group 15 containing metal catalyst compound are in the range of between 0.3:1 to 1000:1, preferably 20:1 to 800:1, and most preferably 50:1 to 500:1. Where the activator is an ionizing activator such as those based on the anion tetrakis(penta fluorophenyl)boron, the mole ratio of the metal of the activator component to the metal component of the Group 15 containing metal catalyst compound is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of a supported Group 15 containing metal catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymerization Process

The catalyst systems, supported catalyst systems or compositions of the invention described above are suitable for use in any prepolymerization and/or polymerization process over a wide range of temperatures and pressures. The temperatures may be in the range of from -60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to12 carbon atoms, and more preferably 2 to 8 carbon atoms. The invention is particularly well suited to the polymerization of two or more olefin monomers of ethylene, propylene, butene-1, pentene-1, 4-methyl-pentene- 1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbomadiene, isobutylene, isoprene, vinylbenzocyclobutane, styrenes, alkyl substituted styrene, ethylidene norbomene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A- 0 794 200 EP-B1-0 649 992, EP-A- 0 802 202 and EP-B- 634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference A preferred process of the invention is where the process, preferably a slurry or gas phase process is operated in the presence of Group 15 containing metal catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

In an embodiment, the method of the invention provides for injecting an unsupported Group 15 containing metal catalyst system into a reactor, particularly a gas phase reactor. In one embodiment the Group 15 containing metal polymerization catalyst is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with an activator together or separately to a reactor using the injection methods described in PCT publication WO 97/46599, which is fully incorporated herein by reference. Where an unsupported Group 15 containing metal catalyst compound is used the mole ratio of the metal of the activator component to the metal of the Group 15 containing metal catalyst compound is in the range of between 0.3: 1 to 10,000: 1, preferably 100:1 to 5000: 1, and most preferably 500:1 to 2000:1.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from no measurable flow to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{12}/I_2$) ($I_{21}$, is measured by ASTM-D-1 238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The Group 15 containing metal compound, when used alone, produces a high weight average molecular weight $M_w$ polymer (such as for example above 100,000, preferably above 150,000, preferably above 200,000, preferably above 250,000, more preferably above 300,000).

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Example 1

Preparation of [(2,4,6-Me$_3$ C$_6$H$_2$)NHCH$_2$CH$_2$]$_2$ (NH ligand)

A 2 L one-armed Schlenk flask was charged with a magnetic stir bar, diethylenetriamine (23.450 g, 0.227 mol), 2-bromomesitylene (90.51 g, 0.455 mol), tris(dibenzylideneacetone)dipalladium (1.041 g, 1.14 mmol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100°C. After 18 h the reaction was complete, as judged by proton NMR spectroscopy. All remaining manipulations can be performed in air. All solvent was removed under vacuum and the residues dissolved in diethyl ether (1 L). The ether was washed with water (3 times with 250 mL) followed by saturated aqueous NaCl (180 g in 500 mL) and dried over magnesium sulfate (30 g).

Removal of the ether in vacuo yielded a red oil which was dried at 70° C. for 12 h under vacuum (yield: 71.10 g, 92%). $^1$H NMR (C$_6$D$_6$) δ6.83 (s, 4), 3.39 (br s, 2), 2.86 (t, 4), 2.49 (t, 4), 2.27 (s, 12), 2.21 (s, 6), 0.68 (br s, 1).

Comparative Example 2

Preparation of {[(2,4,6-Me$_3$C$_6$H$_2$)NCH$_2$CH$_2$]$_2$NH}ZrCl$_2$-(ZrCl$_2$-HN3)

5.480 g of Zr(NMe$_2$)$_4$ (20.48 mmol) was dissolved in 50 mL of pentane in a 250 mL round bottom flask. 6.656 g of [(2,4,6-Me$_3$C$_6$H$_2$)NHCH$_2$CH$_2$]2NH (20.48 mmol) was added as a pentane solution (50 mL) and the solution stirred for 2 hours. The mixed amide {[(2,4,6-Me$_3$C$_6$H$_2$)NCH$_2$CH$_2$]$_2$NH}Zr(NMe$_2$)$_2$ was identified by proton NMR but was not isolated. $^1$H NMR (C$_6$D$_6$)δ6.94 (m, 4), 3.33 (m, 2), 3.05 (s, 6), 3.00 2.59 (m, 4), 2.45 (s, 6), 2.43 (s, 6), 2.27 (s, 6), 2.20 (s, 6), 1.80 (m, 1). The solvent was removed under vacuum. The residues were dissolved in toluene and 6.0 g of ClSiMe3 (55 mmol) added in one portion. The solution was stirred for 24 hours. The solvent was removed under vacuum and the solids suspended in pentane. The solid was collected by filtration and wash with pentane (5.528 g, 54% yield). The dichloride {[(2,4,6-Me3C6H2)NCH$_2$CH$_2$]$_2$NH}ZrCl$_2$ was identified by proton NMR. $^1$H NMR (C$_6$D$_6$) δ6.88 (s, 2), 6.81 (s, 2), 3.32 (m, 2), 2.86 (m, 2), 2.49 (s, 6), 2.47 (m, 4), 2.39 (s, 6) NH was obscured.

Comparative Example 3

Preparation of {[(2,4,6-Me$_3$C$_6$H$_2$)NCH$_2$CH$_2$]$_2$NH}ZrCl$_2$-(ZrCl$_2$-HN3)

3.075 g of Hf(NMe$_2$)$_4$ (8.66 mmol) was dissolved in 100 mL of pentane in a 250 mL round bottom flask. 2.942 g of [(2,4,6-Me$_3$C$_6$H$_2$)NHCH$_2$CH$_2$]2NH (8.66 mmol) was added as a solid and the solution stirred for 2 hours. The mixed amide {[(2,4,6-Me$_3$C$_6$H$_2$)NCH$_2$CH$_2$]2NH}Hf(NMe$_2$)$_2$ was identified by proton NMR but was not isolated. $^1$H NMR (C$_6$D$_6$)δ6.95 (s, 4), 3.40 (m, 2), 3.08 (s, 6), 3.04 (m, 2) 2.49 (s, 6), 2.47 (s, 6), 2.32 (s, 6), 2.20 (s, 6), 1.72 (m, 1). The solvent was removed under vacuum. The residues were dissolved in toluene and 2.825 g of ClSiMe3 (26.0 mmol) added in one portion. The solution was stirred for 24 hours. The solvent was removed under vacuum and the solids suspended in pentane. The solid was collected by filtration and wash with pentane (4.870 g, 96% yield). The dichloride {[(2,4,6-Me3C6H2) NCH$_2$CH$_2$]$_2$NH}HfCl$_2$ was identified by proton NMR. $^1$H NMR (C$_6$D$_6$)δ6.89 (s, 2), 6.84 (s, 2), 3.40 (m, 2), 2.95 (m, 2), 2.51 (s, 6), 2.45 (s, 6), 2.40 (m, 4), 2.14 (s, 6), NH was obscured.

Example 4
Preparation of {[(2,4,6-Me$_3$C$_6$H$_2$)NCH$_2$CH$_2$]$_2$NH}ZrCl$_2$-(ZrCl$_2$-HN3)

A 500 mL round bottom flask was charged with a magnetic stir bar, tetrabenzyl zirconium (Boulder Scientific) (41.729 g, 91.56 mmol), and 300 mL of toluene under dry, oxygen-free nitrogen. Solid HN3 ligand above (32.773 g, 96.52 mmol) was added with stirring over 1 minute (the desired compound precipitates). The volume of the slurry was reduced to 100 mL and 300 mL of pentane added with stirring. The solid yellow-orange product was collected by filtration and dried under vacuum (44.811 g, 80% yield). $^1$H NMR (C$_6$D$_6$)δ8 7.22–6.81 (m, 12), 5.90 (d, 2), 3.38 (m, 2), 3.11 (m, 2), 3.01 (m, 1)2.49 (m, 4), 2.43 (s, 6), 2.41 (s, 6), 2.18 (s, 6), 1.89 (s, 2), 0.96 (s, 2).

Example 5
Preparation of {[(2,4,6-Me$_3$C$_6$H$_2$)NCH$_2$CH$_2$]$_2$NH}ZrCl$_2$-(ZrCl$_2$-HN3)

A 250 mL round bottom flask was charged with a magnetic stir bar, tetrabenzyl hafnium (4.063 g, 7.482 mmol), and 150 mL of toluene under dry, oxygen-free nitrogen. Solid triamine ligand above (2.545 g, 7.495 mmol) was added with stirring over 1 minute (the desired compound precipitates). The volume of the slurry was reduced to 30 mL and 120 niL of pentane added with stirring. The solid pale yellow product was collected by filtration and dried under vacuum (4.562 g, 87% yield). $^1$H NMR (C$_6$D$_6$)δ6 7.21–6.79 (m, 12), 6.16 (d, 2), 3.39 (m, 2), 3.14 (m, 2), 2.65 (s, 6), 2.40 (s, 6), 2.35(m, 2), 2.33(m, 2), 2.19 (s, 6) 1.60 (s, 2), 1.26 (s, 2), NH obscured.

Comparative Example 6
Preparation of Catalvst A

To 2.051 g of MAO (6.836 g of a 30 weight percent solution in toluene, available from Albemarle Corporation, Baton Rouge, Louisiana) and 7.285 g of toluene in a 100 mL round bottom flask was added 0.145 g of ZrCl2-HN3 of Comparative Example 2. The solution was stirred for 15 minutes. 5.070 g of silica (Davison 948, calcined at 600° C. available from W. R. Grace, Davison Division, Baltimore, Md.) was added followed by mixing. The mixture was dried overnight under vacuum affording 7.011 g of finished catalyst with a loading of 0.36 weight percent zirconium and an Al/Zr ratio of 122:1.

Example 7
Preparation of Catalyst B

To 0.801 g of MAO (2.670 g of a 30 weight percent solution in toluene, available from Albemarle Corporation, Baton Rouge, La.) and 4.679 g of toluene in a 100 mL round bottom flask was added 0.070 g of Zr-HN3 of Example 4. The solution was stirred for 15 minutes. 2.130 g of silica (Davison 948, calcined at 600° C., available from W. R. Grace, Davison Division, Baltimore, Md.) was added followed by mixing. The mixture was dried overnight under vacuum affording 2.899 g of finished catalyst with a loading of 0.35 weight percent zirconium and an Al/Zr ratio of 120:1.

Comparative Example 8
Preparation of Catalvst C

To 0.858 g of MAO (2.640 g of a 30 weight percent solution in toluene, available from Albemarle Corporation, Baton Rouge, La.) and 2.860 g of toluene in a 100 mL round bottom flask was added 0.067 g of HfCl$_2$-HN3 of Comparative Example 3. The solution was stirred for 15 minutes. 2.140 g of silica (Davison 948, calcined at 600° C., available from W. R. Grace, Davison Division, Baltimore, Md.) was added followed by mixing. The mixture was dried overnight under vacuum affording 2.901 g of finished catalyst with a loading of 0.68 weight percent hafnium and an Al/Hf ratio of 129:1.

Example 9
Preparation of Catalyst D

To 0.792 g of MAO (2.640 g of a 30 weight percent solution in toluene, available from Albemarle Corporation, Baton Rouge, La.) and 2.830 g of toluene in a 100 mL round bottom flask was added 0.080 g of Hf-HN3 of Example 5. The solution was stirred for 15 minutes. 2.130 g of silica (Davison 948, calcined at 600° C., available from W. R. Grace, Davison Division, Baltimore, Md.) was added followed by mixing. The mixture was dried overnight under vacuum affording 2.908 g of finished catalyst with a loading of 0.68 weight percent hafnium and an Al/Hf ratio of 119:1.

Comparative Example 10
Slurry-Phase Ethylene Polymerization with Catalvst A

Polymerization was performed in the slurry-phase in a 1-liter autoclave reactor equipped with a mechanical stirrer, an external water jacket for temperature control, a septum inlet and vent line, and a regulated supply of dry nitrogen and ethylene. The reactor was dried and degassed at 160° C. Isobutane (400 mL) was added as a diluent and 0.7 mL of a 25 weight percent trioctyl aluminum solution in hexane was added as a scavenger using a gas tight syringe. The reactor was heated to 90° C. 0.200 g of finished catalyst A was added with ethylene pressure and the reactor was pressurized with 143 psi (986 kPa) of ethylene. The polymerization was continued for 40 minutes while maintaining the reactor at 90° C. and 143 psi (986 kPa) by constant ethylene flow. The reaction was stopped by rapid cooling and vented. 10.5 g of polyethylene was obtained (Flow Index (FI)=no flow, activity=209 g polyethylene/mmol catalyst·atm·h).

Example 11
Slurry-Phase Ethylene Polymerization with Catalvst B

Polymerization was performed in the slurry-phase in a 1-liter autoclave reactor equipped with a mechanical stirrer, an external water jacket for temperature control, a septum inlet and vent line, and a regulated supply of dry nitrogen and ethylene. The reactor was dried and degassed at 160° C. Isobutane (400 mL) was added as a diluent and 0.7 mL of a 25 weight percent trioctyl aluminum solution in hexane was added as a scavenger using a gas tight syringe. The reactor was heated to 90° C. 0.100 g of finished catalyst B was added with ethylene pressure and the reactor was pressurized with 144 psi (993 kPa) of ethylene. The polymerization was continued for 30 minutes while maintaining the reactor at 90° C. and 144 psi (993 kPa) by constant ethylene flow. The reaction was stopped by rapid cooling and vented. 11.8 g of polyethylene was obtained (FI=no flow, activity=641 g polyethylene/mmol catalyst·atm·h).

Comparative Example 12
Slurry-Phase Ethylene Polymerization with Catalvst C

Polymerization was performed in the slurry-phase in a 1-liter autoclave reactor equipped with a mechanical stirrer, an external water jacket for temperature control, a septum inlet and vent line, and a regulated supply of dry nitrogen and ethylene. The reactor was dried and degassed at 160° C. Isobutane (400 mL) was added as a diluent and 0.7 mL of a 25 weight percent trioctyl aluminum solution in hexane was added as a scavenger using a gas tight syringe. The reactor was heated to 90° C. 0.200 g of finished Catalyst C was added with ethylene pressure and the reactor was pressurized with 113 psi (779 kPa) of ethylene. The polymerization was continued for 40 minutes while maintaining the reactor at 90° C. and 113 psi (779 kPa) by constant ethylene flow. The reaction was stopped by rapid cooling and vented. 11.9 g of polyethylene was obtained (FI=no flow, activity=311 g polyethylene/mmol catalyst·atm·h).

Example 13

Slurry-Phase Ethylene Polymerization with Catalyst D

Polymerization was performed in the slurry-phase in a 1-liter autoclave reactor equipped with a mechanical stirrer, an external water jacket for temperature control, a septum inlet and vent line, and a regulated supply of dry nitrogen and ethylene. The reactor was dried and degassed at 160° C. Isobutane (400 mL) was added as a diluent and 0.7 mL of a 25 weight percent trioctyl aluminum solution in hexane was added as a scavenger using a gas tight syringe. The reactor was heated to 90° C. 0.200 g of finished Catalyst D was added with ethylene pressure and the reactor was pressurized with 130 psi (896 kPa) of ethylene. The polymerization was continued for 30 minutes while maintaining the reactor at 90° C. and 130 psi (896 kPa) by constant ethylene flow. The reaction was stopped by rapid cooling and vented. 29.1 g of polyethylene was obtained (FI=no flow, activity=881 g polyethylene/mmol catalyst·atm·h).

From the data presented above under similar conditions the Group 15 containing metal catalyst compound having the substituted hydrocarbon leaving group, preferably the alkyl substituted with an aryl group of the invention has a much higher productivity than the same compound having a halogen.

While the present invention has been described and illustrated by reference to particular embodiments, those of ordinary skill in the art will appreciate that the invention lends itself to variations not necessarily illustrated herein. For example, it is contemplated that two or more Group 15 containing catalyst compositions of the invention can be used. Also it is contemplated that a Group 15 containing metal catalyst compound having a substituted alkyl leaving group of the invention can be used with a Group 15 containing metal catalyst compound having halogen leaving groups. For this reason, then, reference should be made solely to the appended claims for purposes of determining the true scope of the present invention.

I claim:

1. A process for polymerizing olefin(s) in the presence of a catalyst system comprising a Group 15 containing bidentate or tridentate ligated metal catalyst compound, wherein the process is conducted at a temperature from between 50° C. to 200° C., and wherein the catalyst compound is represented by the formulae:

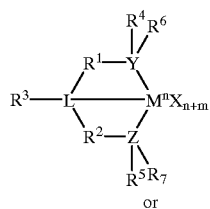

Formula (I)

or

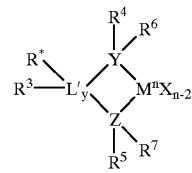

Formula (II)

wherein M is metal;
each X is an aryl substituted alkyl leaving group;
y is 0 or 1;
n is the oxidation state of M;
m is the formal charge of Y, Z and L or of Y, Z, and L';
L is a Group 15 element;
L' is a Group 15 element or Group 14 containing group;
Y is a Group 15 element;
Z is a Group 15 element;
$R_1$ and $R^2$ are independently a $C_1$ to $C_{20}$ hydrocarbon group, a heteroatom containing group having up to twenty carbon atoms, silicon, germanium, tin, lead, or phosphorus;
$R^3$ is absent, a hydrocarbon group, hydrogen, a halogen, or a heteroatom containing group;
$R^4$ and $R^5$ are independently an alkyl group, an aryl group, a substituted aryl group, a cyclic alkyl group, a substituted cyclic alkyl group, a cyclic arylalkyl group, a substituted cyclic arylalkyl group or a multiple ring system;
$R^1$ and $R^2$ may be interconnected to each other, and/or $R^4$ and $R^5$ may be interconnected to each other;
$R^6$ and $R^7$ are independently absent, hydrogen, an alkyl group, halogen, heteroatom or a hydrocarbyl group; and
$R^*$ is absent, hydrogen, a Group 14 atom containing group, a halogen, or a heteroatom containing group.

2. The process of claim 1 wherein $R^1$ and $R^2$ are selected from the group consisting of a $C_1$ to $C_{20}$ hydrocarbon group, a heteroatom containing group, silicon, germanium, tin, lead, and phosphorus.

3. The process of claim 1 wherein L or L' may also be bound to nothing, a hydrogen, a Group 14 atom containing group, a halogen, or a heteroatom containing group, and wherein each of the two Group 15 atoms are also bound to a cyclic group and may optionally be bound to hydrogen, a halogen, a heteroatom, a hydrocarbyl group, or a heteroatom containing group.

4. The process of claim 1 wherein $R^4$ and $R^5$ are represented by the formula:

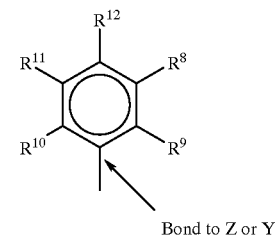

Bond to Z or Y wherein $R^8$ to $R^{12}$ are each independently hydrogen, a $C_l$ to $C_{40}$ alkyl group, a halide, a heteroatom, or a heteroatom containing group containing up to 40 carbon atoms, wherein any two R groups may form a cyclic group and/or a heterocyclic group, and wherein the cyclic groups may be aromatic.

5. The process of claim 4 wherein $R^9$, $R^{10}$ and $R^{12}$ are independently a methyl, ethyl, propyl or butyl group and X is a substituted aryl group having greater than 10 carbon atoms.

6. The process of claim 4 wherein $R^9$, $R^{10}$ and $R^{12}$ are methyl groups, and $R^8$ and $R^{11}$ are hydrogen and X is a alkyl substituted with an aryl group.

7. The process of claim 4 wherein L, Y, and Z are nitrogen, $R^1$ and $R^2$ are a hydrocarbon radical, $R^3$ is hydrogen, and $R^6$ and $R^7$ are absent.

8. The process of claim 1 wherein L and Z are independently nitrogen, L' is a hydrocarbyl radical, and $R^6$ and $R^7$ are absent.

9. The process of claim 1 wherein the catalyst system is supported on a carrier.

10. The process of claim 1 wherein the process is a continuous gas phase process.

11. The process of claim 1 wherein the process is a continuous slurry phase process.

12. The process of claim 1 wherein the olefin(s) is ethylene or propylene.

13. The process of claim 1 wherein the olefins are ethylene and at least one other monomer having from 3 to 20 carbon atoms.

14. The process of claim 1 wherein the catalysts system further comprises an activator.

* * * * *